US005624510A

United States Patent [19]

Uchida et al.

[11] Patent Number: 5,624,510

[45] Date of Patent: Apr. 29, 1997

[54] METHOD FOR PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 340,443

[22] Filed: Nov. 14, 1994

Related U.S. Application Data

[63] Continuation of Ser. No. 21,554, Feb. 24, 1993, abandoned.

[30] Foreign Application Priority Data

Feb. 25, 1992 [JP] Japan .................................... 4-073221

[51] Int. Cl.[6] .................................................. B29C 39/12

[52] U.S. Cl. ......................... 156/62.2; 264/113; 264/139; 264/245; 264/DIG. 31; 427/198; 427/201

[58] Field of Search ............................ 156/63, 257, 267, 156/268, 248, 62.2; 427/197, 198, 201; 264/101, 109, 112, 113, 125, 139, 239, 241, 245, DIG. 31

[56] References Cited

U.S. PATENT DOCUMENTS

| | | | |
|---|---|---|---|
| 148,986 | 3/1874 | Rhinelander | 264/246 X |
| 176,666 | 4/1876 | Mitchell | 264/246 X |
| 233,973 | 11/1880 | Brigham | 264/246 X |
| 251,924 | 1/1882 | Horn | 264/246 X |
| 285,619 | 9/1883 | Hirst | 264/246 X |
| 313,221 | 3/1885 | Marsh | 264/246 X |
| 488,540 | 12/1892 | Cousins | 264/246 |
| 704,621 | 7/1902 | Czermak | 264/246 X |
| 731,254 | 6/1903 | Whitman | 264/246 X |
| 1,138,929 | 5/1915 | Boyd | 426/282 |
| 1,201,187 | 10/1916 | Jaek | 427/198 |
| 1,239,167 | 9/1917 | Dickson | 426/282 |
| 1,376,748 | 5/1921 | Earley | 264/232 X |
| 1,583,516 | 5/1926 | Anfield | 264/245 X |
| 1,657,784 | 1/1928 | Bergstrom | 51/295 X |
| 1,659,056 | 2/1928 | Simmons | 427/198 |
| 1,924,787 | 2/1933 | Hill | 427/287 X |
| 2,434,477 | 1/1948 | Winter | 264/245 X |
| 2,876,575 | 3/1959 | Leika | 156/268 X |
| 3,097,080 | 7/1963 | Weir | 427/201 X |
| 3,192,063 | 6/1965 | Donofrio | 427/198 |
| 3,194,856 | 7/1965 | Palmer | 264/246 X |
| 3,463,653 | 8/1969 | Letter | 264/246 X |
| 3,682,738 | 8/1972 | Smith | 427/197 X |
| 3,956,052 | 5/1976 | Koste | 156/268 X |
| 4,126,500 | 11/1978 | Palanos | 156/268 X |
| 4,605,463 | 8/1986 | Kidokoro | 156/268 X |
| 4,844,757 | 7/1989 | Nagata | 156/268 X |

(List continued on next page.)

FOREIGN PATENT DOCUMENTS

| | | | |
|---|---|---|---|
| 0558248 | 9/1993 | European Pat. Off. . | |
| 0586257 | 3/1994 | European Pat. Off. . | |
| 0611639 | 8/1994 | European Pat. Off. . | |
| 2117007 | 2/1971 | France . | |
| 2596706 | 4/1986 | France . | |
| 2155021 | 5/1973 | Germany | 427/198 |
| 4049274 | 5/1985 | Japan | 427/198 |
| 4105903 | 7/1992 | Japan . | |
| 2407 | of 1885 | United Kingdom | 427/198 |
| 1121082 | 7/1968 | United Kingdom | 427/198 |
| 2215266 | 9/1989 | United Kingdom . | |

*Primary Examiner*—James Sells

*Attorney, Agent, or Firm*—Oblon, Spivak, McClelland, Maier & Neustadt, P.C.

[57] ABSTRACT

A patterned shaped article is produced by a method which includes the steps of supplying a first material onto a given surface until the first material forms a layer of predetermined thickness, removing part of the layer to form at least one concave portion in the layer, filling the at least one concave portion with at least one kind of second material different in color and quality from the first material, and causing the first and second materials to set into an integral mass. When the first material is dry, the second material may be either dry or wet. When the first material is wet, the second material is dry and the moisture of the first wet material is absorbed before the step of removing part of the layer of the first material.

9 Claims, 10 Drawing Sheets

U.S. PATENT DOCUMENTS

| | | | |
|---|---|---|---|
| 4,844,850 | 7/1989 | Harder | 264/246 X |
| 4,881,999 | 11/1989 | Balmer | 156/231 X |
| 4,889,666 | 12/1989 | Kawasaki | 264/246 X |
| 5,017,320 | 5/1991 | Garcia | 264/148 |
| 5,047,187 | 9/1991 | Banus | 264/71 |
| 5,185,192 | 2/1993 | Banus | 156/63 X |
| 5,209,949 | 5/1993 | Osada | 427/198 |
| 5,227,108 | 7/1993 | Reid, Jr. | 264/148 |

METHOD FOR PRODUCING PATTERNED SHAPED ARTICLE

This application is a Continuation of application Ser. No. 08/021,554, filed on Feb. 24, 1993, now abandoned.

BACKGROUND OF THE INVENTION

1. Field of the Invention

The present invention relates to a method for producing patterned shaped articles including concrete shaped articles, artificial stone shaped articles, raw products for ceramic shaped articles, ceramic shaped articles, crystalline glass shaped articles, enameled wares, cloisonne wares, plastic shaped articles and shaped foodstuffs.

2. Description of the Prior Art

The conventional method of providing part of or an entire paved surface constituted of paving blocks with a pattern indicating, for example, a crosswalk, a stop intersection or other such traffic control mark has been either to apply paint to the surface in the desired pattern or to inlay the surface with another material in the desired pattern.

However, since the patterns painted on part of or the entire surface of the paving blocks are exposed to abrasion from pedestrians' shoes and/or vehicle tires and the like, they quickly wear off and have to be redone at frequent intervals, at a considerable cost in terms of labor and materials. Where the pattern is formed by inlaying, the work itself is troublesome and very costly.

The present invention has been accomplished in view of these drawbacks encountered by the conventional method.

The main object of the present invention is to provide a method for producing patterned shaped articles, according to which it is possible to precisely form a pattern course having a prescribed thickness with ease and maintain the pattern in excellent condition even when it is exposed to surface abrasion.

SUMMARY OF THE INVENTION

To attain the object described above, according to the present invention there is provided a method for producing a patterned shaped article, comprising the steps of supplying a first material onto a given surface until the first material forms a layer of predetermined thickness, removing part of the layer to form at least one concave portion, filling the at least one concave portion with at least one type of second material different in terms of color and quality from the first material, and causing the first and second materials to set into an integral mass.

Where the first material is dry, part of the layer of first material formed on a given surface is directly removed to form at least one concave portion and then the at least one concave portion is filled with a second dry or wet material. Where the first material is wet, however, the layer of first material formed on a given surface is deprived of moisture, part of the resultant layer of first material is removed to form at least one concave portion, and the at least one concave portion is filled with a second dry material.

In the prior art, it takes much time and labor to produce a shaped article because a plurality of materials constituting the desired pattern are separately supplied with their shapes retained. According to the present invention, however, a shaped article having a complex pattern can be produced with ease owing to the adoption of the steps of supplying a first material (a base course material) onto a given surface to form a wide base-course layer of a prescribed thickness on the given surface, removing part of the base-course layer to form at least one concave portion, and thereafter filling the at least one concave portion with a second material (a pattern course material).

The above and other objects, characteristic features and advantages of the present invention will become more apparent to those skilled in the art from the disclosure of the present invention made hereinbelow with reference to the accompanying drawings.

DESCRIPTION OF THE PREFERRED EMBODIMENTS

Figure 1:
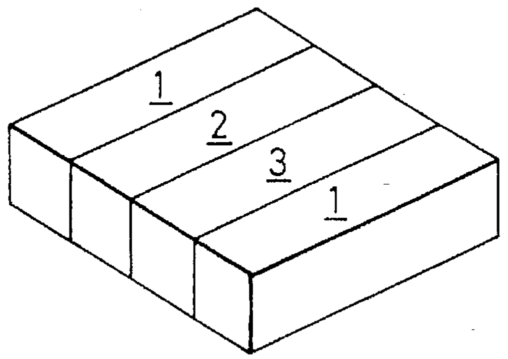
FIG. 1 is a perspective view showing a first example of the patterned shaped article produced by the method according to the present invention.

The present invention will now be described in detail with reference to the illustrated examples of patterned shaped articles.

FIG. 1 to FIG. 5 show examples of the patterned shaped articles obtained by the method of the present invention. The article shown in FIG. 1 has a striped pattern of red, white, blue and red layers 1, 2, 3 and 1 aligned in the order mentioned, with the striped pattern appearing on its obverse and reverse surfaces. The article shown in FIG. 2 has a backing layer 4 integral with the reverse surface of the article of FIG. 1. The article shown in FIG. 3 has a backing layer formed of the two red layers 1 sandwiching the white and blue layers 2 and 3 therebetween. The article shown in FIG. 4 has a backing layer formed of the blue layer 3 sandwiched between the white layer 2 and one red layer 1. The article shown in FIG. 5 has a tree pattern and consists of a white background 2, a brown tree 5 (trunk and branches) and green leaves 6, with the brown tree 5 and green leaves 6 appearing on its obverse and reverse surfaces.

The patterns that can be formed on shaped articles produced by the method of the present invention are not limited to the illustrated examples. Any other pattern, including floral patterns, can be formed according to the method of the present invention. In the interest of simplicity, however, the method of the present invention for producing the shaped articles will be explained with reference to the illustrated patterns.

Figure 6A:
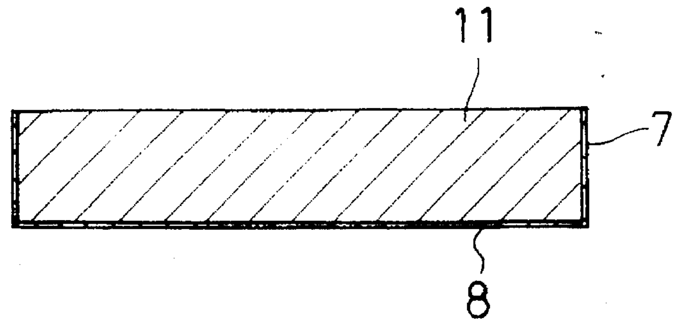
FIGS. 6A–6D are an explanatory view illustrating how the patterned shaped article of FIG. 1 is produced, FIG. 6(A) being a cross section showing the state in which a first material has been supplied to form a layer having a prescribed thickness, FIG. 6(B) being a cross section showing the state in which part of the layer of first material has been removed to form a concave portion, FIG. 6(C) being a cross section showing the state in which part of the concave portion has been filled with a second material, and FIG. 6(D) being a cross section showing the state in which the remaining part of the concave portion has been filled with a third material.
Figure 6B:
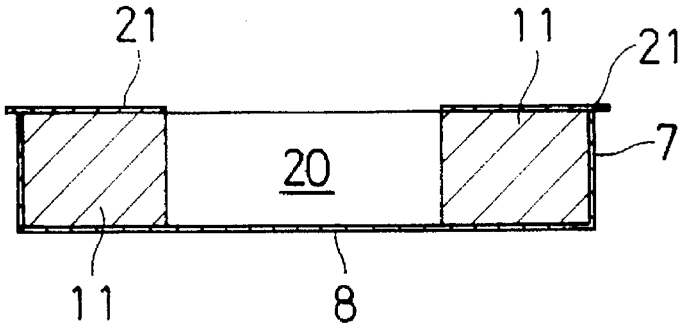
Figure 6C:
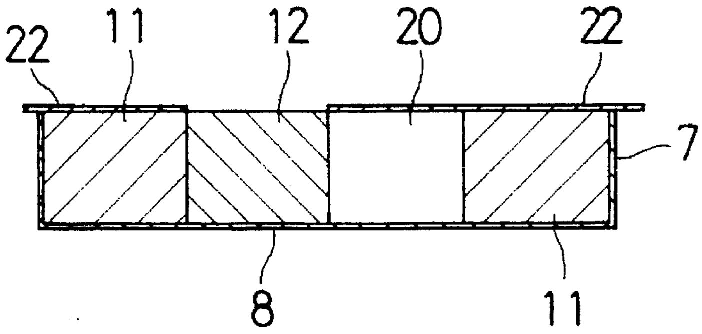
Figure 6D:
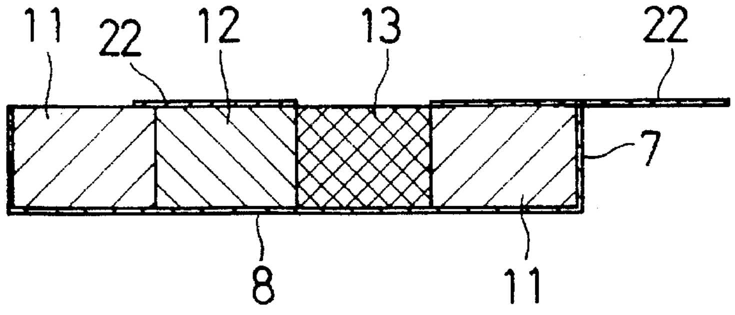

As illustrated in FIG. 6, the patterned shaped article shown in FIG. 1 is produced by using a main form 7 having a bottom plate 8 (a given surface), supplying a red material 11 onto the given surface as shown in FIG. 6(A) to form a red layer, removing part of the red layer by suction under vacuum to form a concave portion 20 as shown in FIG. 6(B), supplying a white material 12 into part of the concave portion 20 as shown in FIG. 6(C), supplying a blue material 13 into the remaining part of the concave portion 20 as shown in FIG. 6(D), causing the red, white and blue materials 11, 12 and 13 to set into an integral mass, and removing the integral mass from the main form 7.

As shown in FIG. 6(B), the concave portion 20 can be precisely formed by applying a mask 21 having an opening of a size corresponding to the total area of the white and blue layers onto the red material 11 supplied into the main form 7 and sucking the red material 11 from the opening of the mask 21.

As shown in FIG. 6(C) and FIG. 6(D), the white and blue layers can be formed by applying a mask 22 having an opening of a size corresponding to the area of the white or blue layer onto the red material 11 in the main form 7 having the concave portion 20 formed therein, supplying the white material 12 into the main form 7 through the opening of the mask 22, moving the mask 22 to the position of the blue layer, and supplying the blue material 13 into the main form 7 through the opening of the mask 22.

Figure 7:
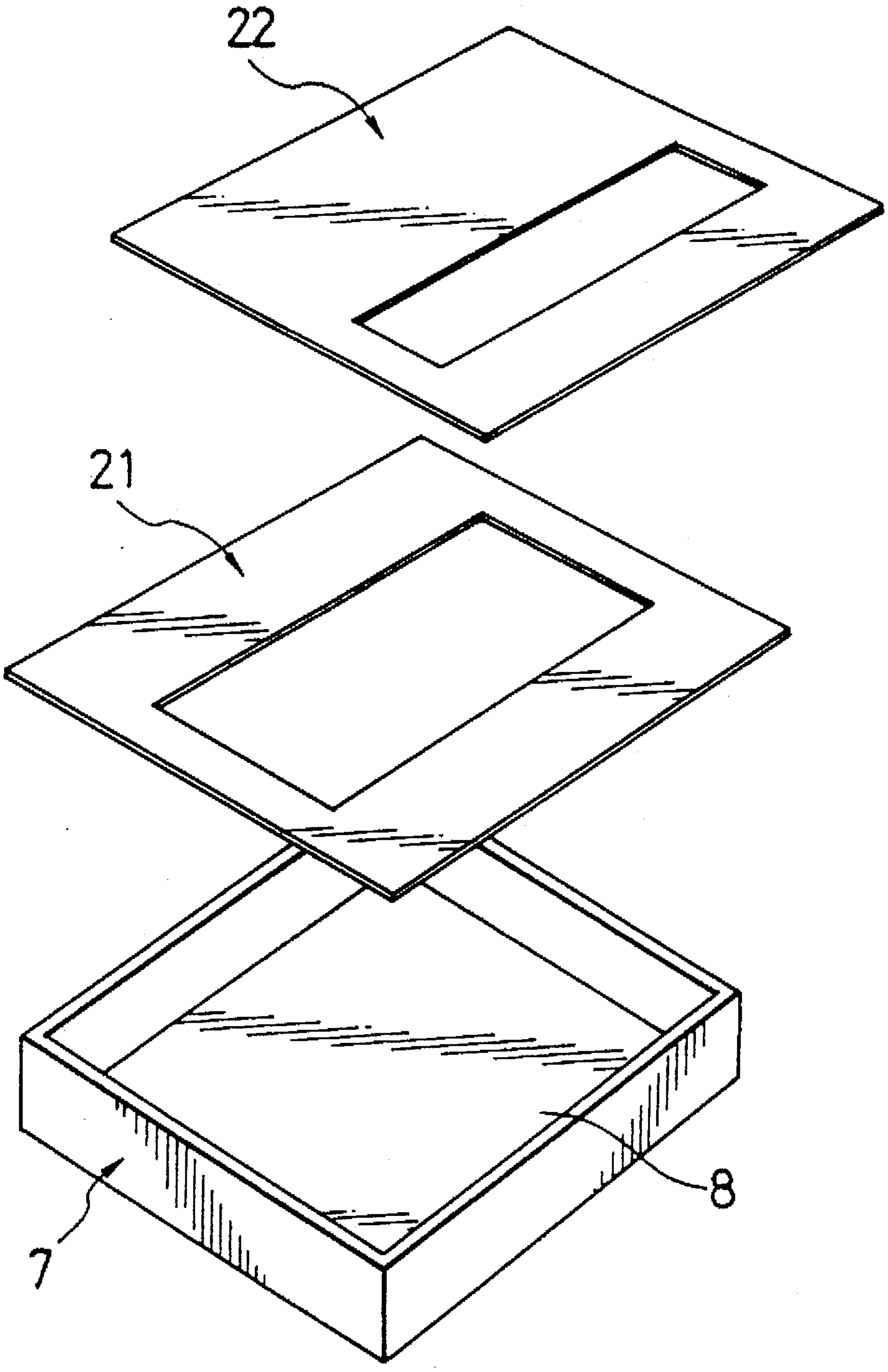
FIG. 7 is a perspective view showing one example of the apparatus used for producing the shaped article of FIG. 6.

An example of the apparatus for producing the shaped article of FIG. 1, including the main form 7, mask 21 for forming the concave portion 20 and mask 22 for supplying the white and blue materials, is shown in FIG. 7.

Figure 2:
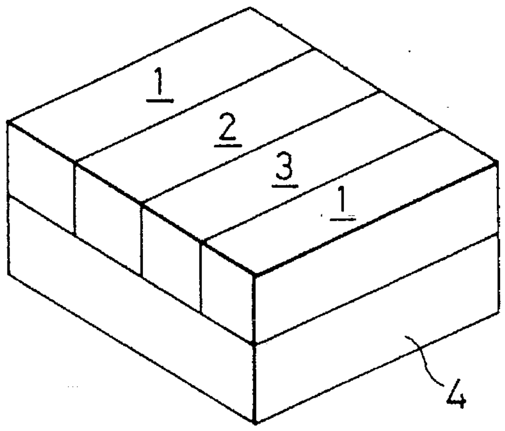
FIG. 2 is a perspective view showing a second example of the patterned shaped article produced by the method according to the present invention.
Figure 8A:
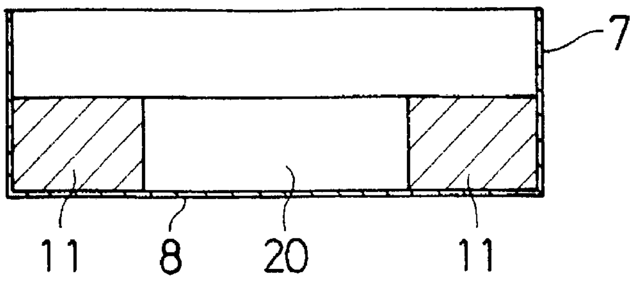
FIGS. 8A–8B are an explanatory view illustrating how the patterned shaped article of FIG. 2 is produced, FIG. 8(A) being a cross section showing the state in which part of a layer of first material has been removed to form a concave portion and FIG. 8(B) being a cross section showing the state in which the concave portion has been filled with second and third materials and then a backing material has been supplied.
Figure 8B:
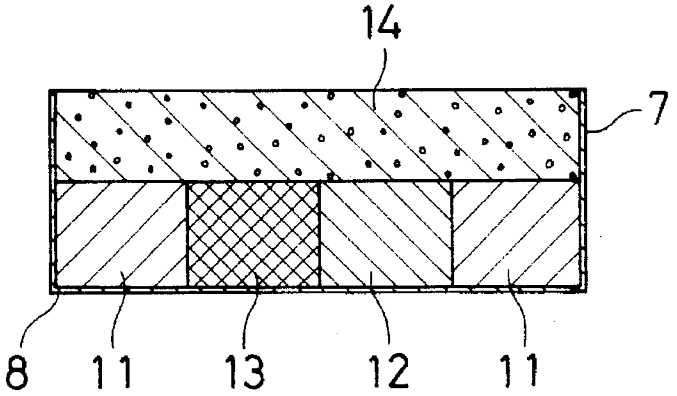
Figure 9A:
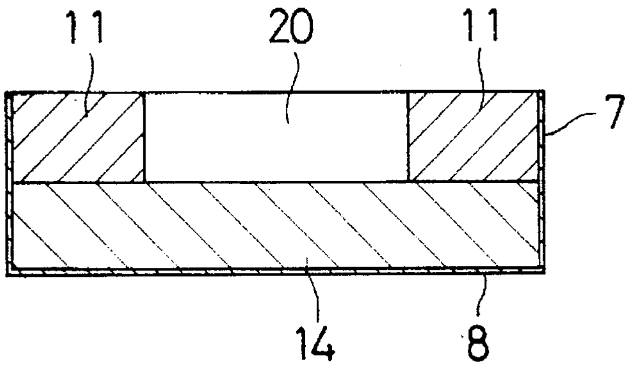
FIGS. 9A–9B are an explanatory view illustrating different steps for producing the patterned shaped article of FIG. 2, FIG. 9(A) being a cross section showing the state wherein part of a layer of first material disposed on a backing material has been removed to form a concave portion and FIG. 9(B) being a cross section showing the state wherein the concave portion has been filled with second and third materials.
Figure 9B:
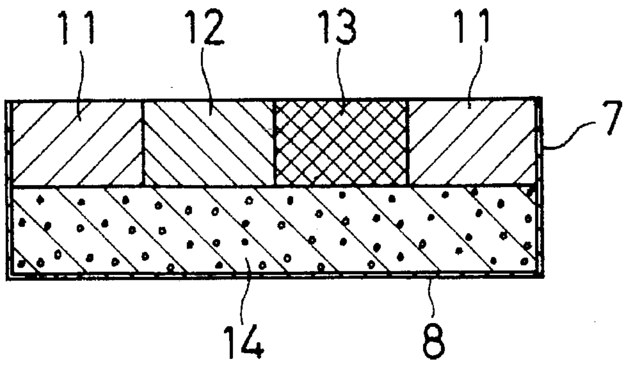

The shaped article of FIG. 2 is produced by using a main form 7 of a larger depth than that of the main form 7 of FIG. 6 and having a bottom plate 8 (a given surface), supplying a red material 11 onto the given surface, forming a concave portion 20 as shown in FIG. 8(A) using the mask 21 and supplying white and blue materials 12 and 13 into the concave portion 20 using the mask 22 in the same manner as shown in FIG. 6, supplying a backing material 14 onto the red, white and blue materials 11, 12 and 13 as shown in FIG. 8(B), causing all the materials to set into an integral mass, and removing the integral mass from the main form 7. Otherwise, the shaped article of FIG. 2 can be formed by supplying a backing material 14 onto the bottom plate 8 of the main form 7, then supplying a red material 11 into the main form 7, with the upper surface of the backing material 14 as a given surface, removing part of the red material 14 to form a concave portion 20 as shown in FIG. 9(A), filling part of the concave portion 20 with a white material 12 and the remaining part of the concave portion 20 with a blue material 13 as shown in FIG. 9(B), causing all the materials to set into an integral mass, and removing the integral mass from the main form 7.

Figure 3:
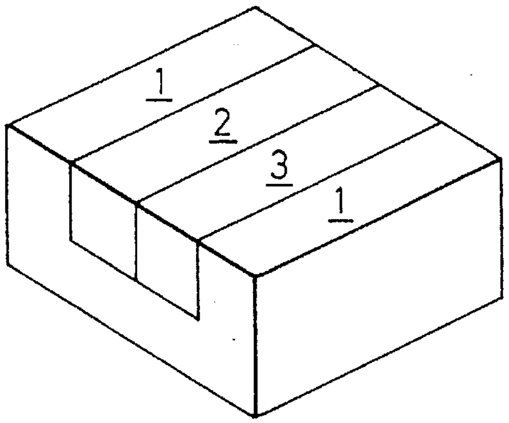
FIG. 3 is a perspective view showing a third example of the patterned shaped article produced by the method according to the present invention.
Figure 10A:
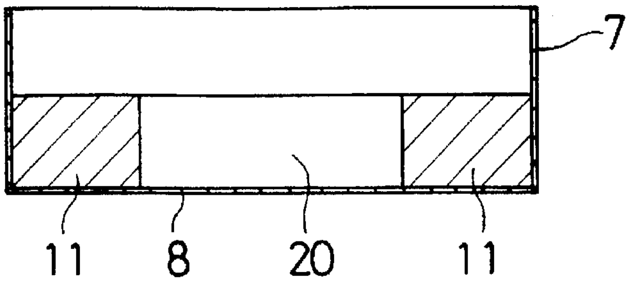
FIGS. 10A–10B are an explanatory view illustrating how the patterned shaped article of FIG. 3 is produced, FIG. 10(A) being a cross section showing the state wherein part of a layer of first material having a predetermined thickness has been removed to form a concave portion and FIG. 10(B) being a cross section showing the state wherein the concave portion has been filled with second and third materials and then the first material has further been supplied.
Figure 10B:
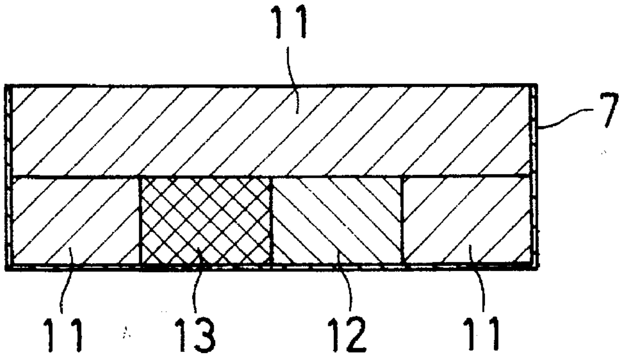

The shaped article of FIG. 3 is produced by supplying a red material 11 onto the bottom plate 8 of the main form 7, removing part of the red material 11 to form a concave portion 20 as shown in FIG. 10(A), filling part of the concave portion 20 with a white material 12 and the remaining part of the concave portion 20 with a blue material 13 and further supplying a red material 11 onto the red, white and blue materials which have already been supplied into the main form 7 as shown in FIG. 10(B), causing all the materials to set into an integral mass, and removing the integral mass from the main form 7.

Figure 11A:
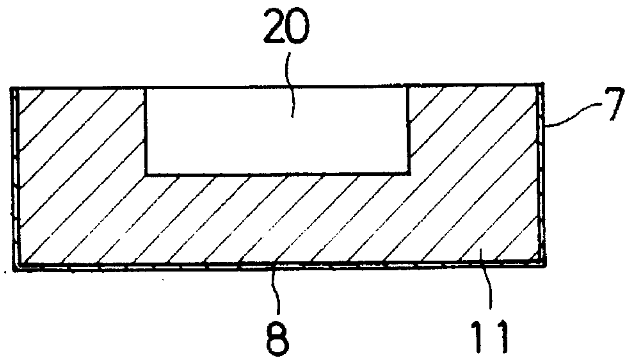
FIGS. 11A–11B are an explanatory view illustrating different steps for producing the patterned shaped article of FIG. 3, FIG. 11(A) being a cross section showing the state wherein part of a layer of first metal has been removed to form a concave portion and FIG. 11(B) being a cross section showing the state wherein the concave portion has been filled with second and third materials.
Figure 11B:
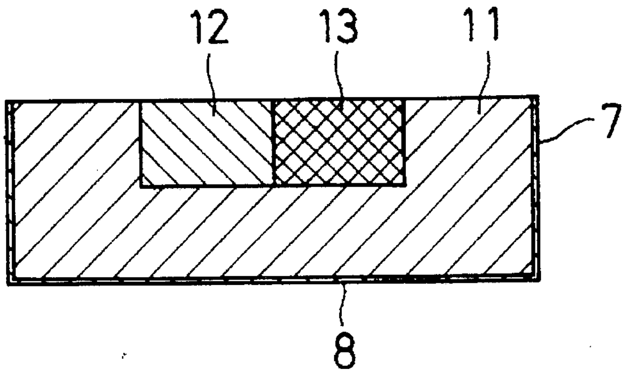

Otherwise, it may be formed by filling the interior of the main form 7 with a red material 11, removing part of the red material 11 to form a shallow concave portion 20 as shown in FIG. 11(A), filling part of the shallow concave portion 20 with a white material 12 and the remaining part of the shallow concave portion 20 with a blue material as shown in FIG. 11(B), causing all the materials to set into an integral mass, and removing the integral mass from the main form 7.

Figure 4:
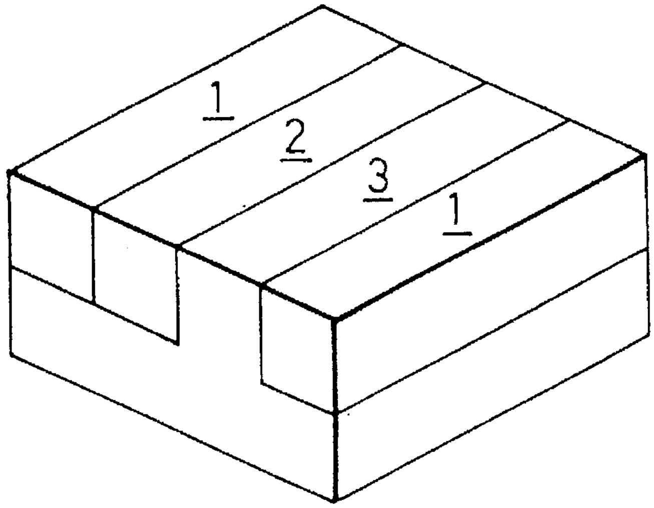
FIG. 4 is a perspective view showing a fourth example of the patterned shaped article produced by the method according to the present invention.
Figure 12A:
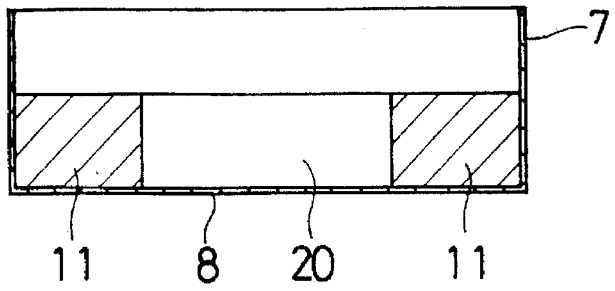
FIGS. 12A–12B are an explanatory view illustrating how the patterned shaped article of FIG. 4 is produced, FIG. 12(A) being a cross section showing the state wherein part of a layer of first material has been removed to form a concave portion and FIG. 12(B) being a cross section showing the state wherein the concave portion is filled with second and third materials and the third material has further been supplied.
Figure 12B:
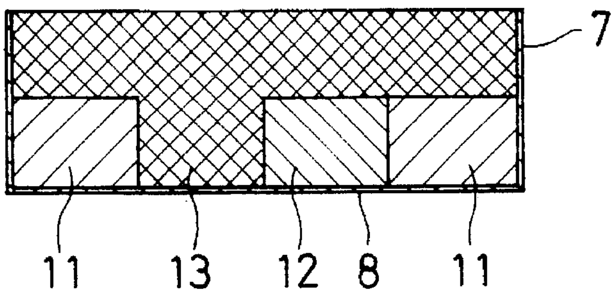

The shaped article of FIG. 4 is produced by supplying a red material 11 into a main form 7, forming a concave portion 20 as shown in FIG. 12(A), filling part of the concave portion 20 with a white material 12 and supplying a blue material 13 into the remaining part of the concave portion 20 and onto the red and white materials 11 and 12 which have already been supplied into the main form 7 as shown in FIG. 12(B), causing all the materials to set into an integral mass, and removing the integral mass from the main form 7.

In the examples described above, since the red material 11 is supplied onto a given surface and formed with a concave portion 20, the red material 11 is called a first material and the white and blue materials are called second materials.

Figure 13A:
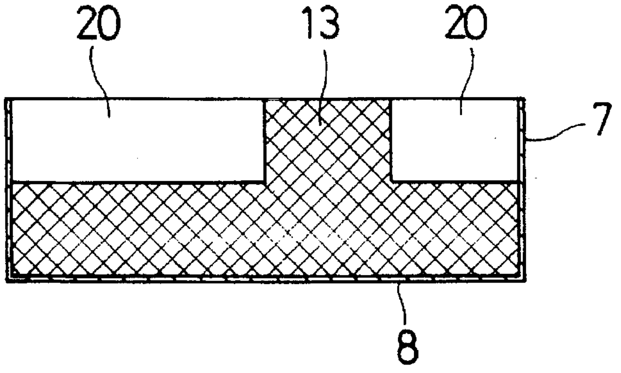
FIGS. 13A–13B are an explanatory view illustrating different steps for producing the patterned shaped article of FIG. 4, FIG. 13(A) being a cross section showing the state wherein part of a layer of third material has been removed to form two concave portions and FIG. 13(B) being a cross section showing the state wherein one of the concave portion has been filled with first and third materials and the other concave portion has been filled with the first material.
Figure 13B:
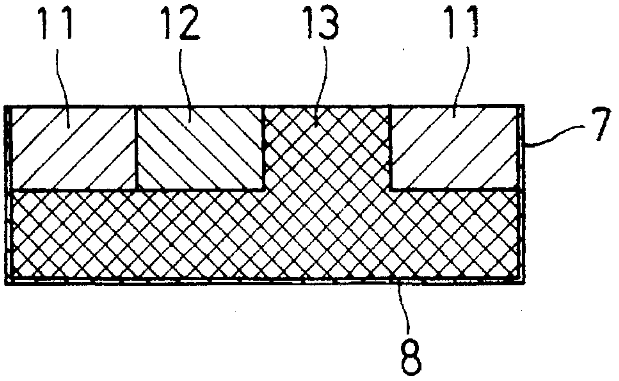

The shaped article of FIG. 4 may be formed by supplying a blue material 13 onto the bottom plate 8 of a main form 7, forming two shallow concave portions 20 in the blue material 13 as shown in FIG. 13(A), filling part of one of the shallow concave portions 20 with a white material 12 and the remaining part of the concave portion 20 and the other shallow concave portion 20 with a red material 11 as shown in FIG. 13(B), causing all the materials to set into an integral mass, and removing the integral mass from the main form 7. In this example, the blue material 13 is called a first material and the white and red materials 12 and 11 are called second materials.

Figure 5:
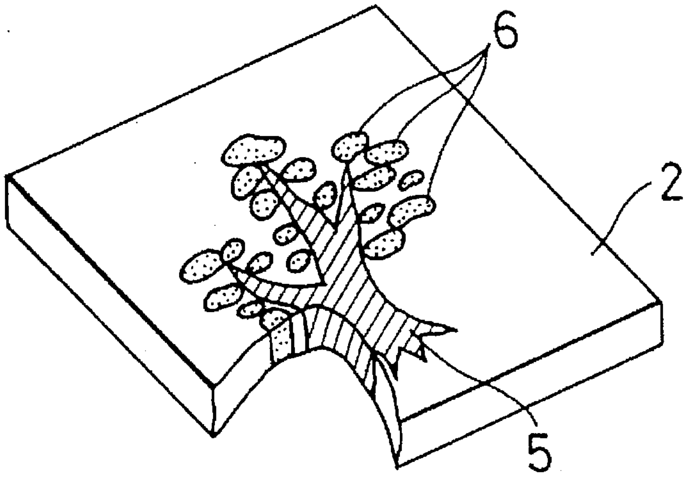
FIG. 5 is a perspective view showing a fifth example of the patterned shaped article produced by the method according to the present invention.
Figure 15A:
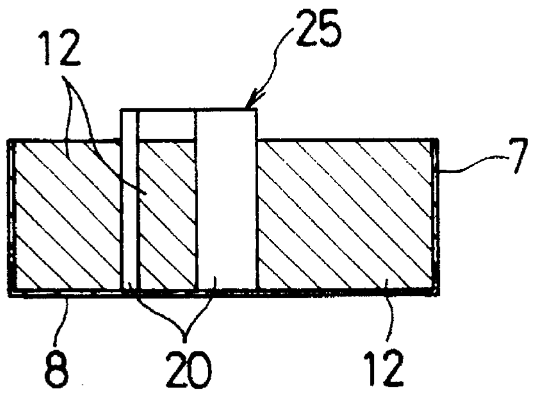
FIGS. 15A–15D are an explanatory view illustrating how the patterned shaped article of FIG. 5 is produced, FIG. 15(A) being a cross section showing the state wherein part of a layer of first material has been removed to form concave portions, FIG. 15(B) being a cross section showing the state wherein the concave portions of FIG. 15(B) have been filled with a second material, FIG. 15(C) being a cross section showing the state wherein part of the layer of first and second materials in FIG. 15(B) has been removed to form concave portions, and FIG. 15(D) being a cross section showing the state wherein the concave portions of FIG. 15(C) have been filled with a third material.
Figure 15B:
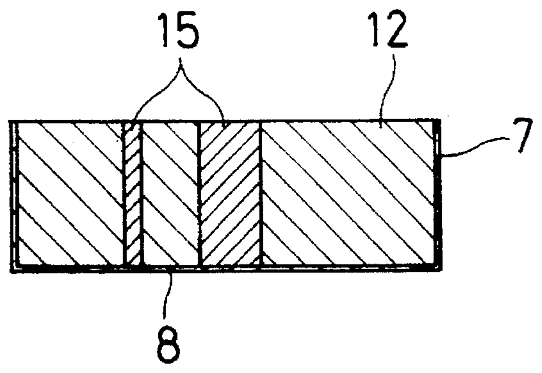
Figure 15C:
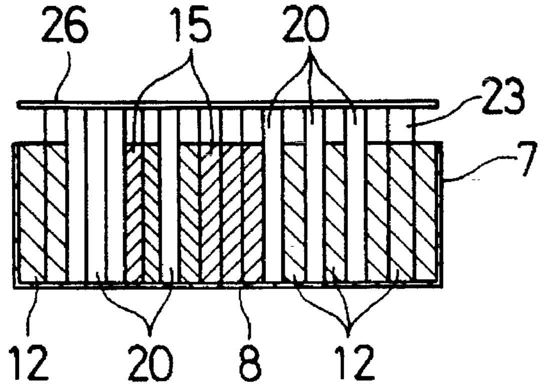
Figure 15D:
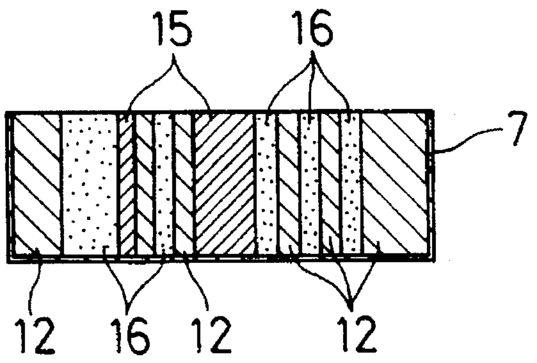
Figure 16:
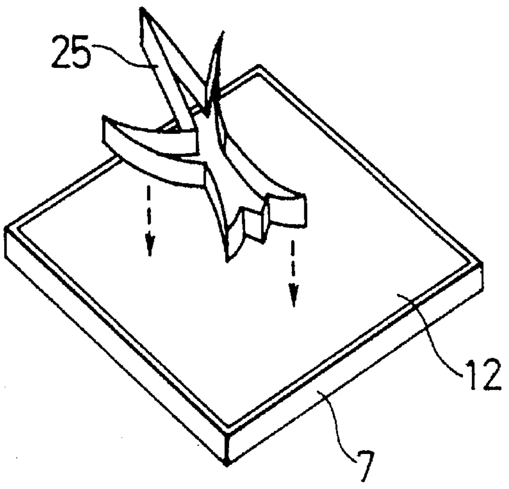
FIG. 16 is a perspective view showing an insert-type mask given a shape corresponding to that of the patterned shaped article of FIG. 5 and used for producing the patterned shaped article of FIG. 5.
Figure 17:
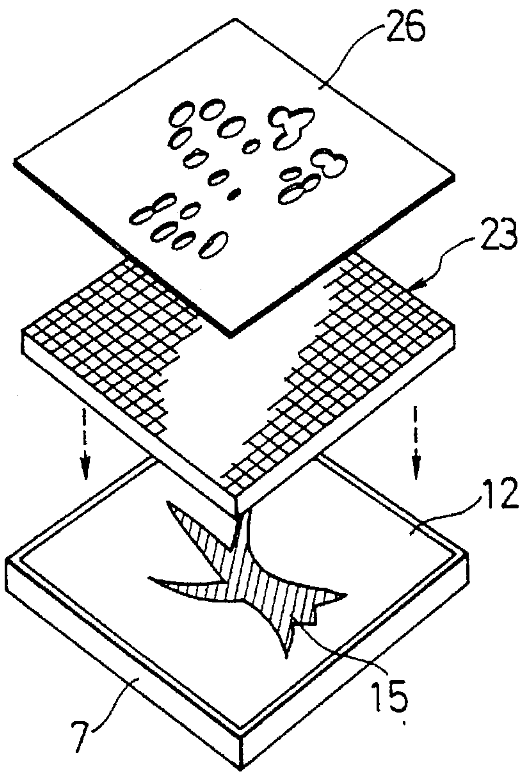
FIG. 17 is a perspective view showing a sheet mask and the cell form mask used for producing the patterned shaped article of FIG. 5.

The shaped article of FIG. 5 is produced by supplying a white material 12 onto the bottom plate 8 of a base form 7 in the same manner as in FIG. 6(A), placing on the white material 12 an insert-type mask 25 representing a tree as shown in FIG. 16, inserting the mask 25 into the white material 12 and removing the white material 12 in the mask 25 by suction under vacuum to form a concave portion 20 as shown in FIG. 15(A), filling the concave portion 20 with a brown material 15 as shown in FIG. 15(B), removing the mask 25 to form a tree layer, placing a cell-form mask 23 on the tree layer and a sheet mask 26 representing leaves on the cell-form mask 23 as shown in FIG. 17, inserting the cell-form mask 23 into the main form 7 and removing the white and brown materials 12 and 15 through the sheet mask 26 by suction under vacuum to form concave portions 20 as shown in FIG. 15(C), filling the concave portions 20 with a green material and removing the sheet mask 26 and cell-form mask 23 as shown in FIG. 15(D), causing all the materials 12, 15 and 16 to set into an integral mass, and removing the integral mass from the main form 7.

In this example, the white material 12 is called a first material and the brown material 15 is called a second material at the first stage of forming the tree pattern and, at the second stage of forming the leaf pattern, the white and brown materials 12 and 15 are called first materials and the green material 16 is called a second material. If the masks 23, 25 and 26 are made of a soluble material, they do not have to be removed. In place of the insert-type mask 25, a sheet mask (not shown) representing a tree may be used to form a tree pattern and the sheet mask 26 may be used to form a leaf pattern without use of the insert-type cell-form mask 23. Further, the formation of dotted concave portions and the supply of materials into the dotted concave portions may be effected by an industrial robot.

When a shaped article is produced using a dry material as the first material, the dry first material may be one which has absorbed some moisture after drying but is not kneaded with water, lubricant-bonding agent, solvent, oil, setting agent or plasticizer and is in a state readily amenable to pulverization before charging. In this case, the second material may be either such a dry material or a wet material kneaded with at least one of water, lubricant-bonding agent, solvent, oil, setting agent and plasticizer. In the finished state, the first and second materials 11, 12, 13, 15 and 16 and the backing material 14 are required to differ from each other in terms of color, luster, texture and the like.

Examples of the dry material for producing a concrete shaped article include cement powder, resin, a mixture of cement powder and resin, and the mixture further containing at least one of a pigment and a fine aggregate. As described above, the wet material is one kneaded with water etc. Examples of the backing material 14 include cement powder, resin, a mixture of cement powder and resin, the mixture further containing a fine aggregate and, if necessary, additionally containing a pigment and at least one of coarse aggregates and various kinds of fibers. The backing material may either be the same material as the first and second materials or be in the form a concrete slurry obtained by kneading with water etc.

The pattern-course materials 11, 12, 13, 15 and 16 and the backing material 14 may, as found necessary, further have mixed therewith pulverized particles or granules of granite, marble, etc., slag, light-reflecting grains, inorganic hollow micro-spheres including Shirasu (pumice ejected from volcanoes and the secondary deposit of such pumice) balloons, pulverized particles or granules of ceramic, grains or granules of new ceramic, metal and ore. They may also contain various additives of congealing and setting agents, water proofing agents, inflating agents. Wood chips may be used as an aggregate or fine aggregate. Examples of the aforementioned various fibers include metal fiber, carbon fiber, synthetic fiber and glass fiber.

All the materials are caused to set within the main form by supplying all the materials into the main form and either allowing them to stand therein or supplying a prescribed amount of water etc. into the main form. When the backing material is wet, however, the amount of water etc. to be supplied is reduced. For example, a plate of metal, wood, cement, glass or ceramic or a sheet of paper, non-woven fabric or woven fabric may be used as the backing material. An asphaltic concrete shaped article can be produced using a thermal fusion material such as asphalt etc.

The pattern-course materials 11, 12, 13, 15 and 16 and the backing material 14 for producing an artificial stone shaped article include wood chips and granules of rock, ceramic, new ceramic, glass, plastic and metal. They may, if necessary, contain a pigment-containing aggregate and a setting agent for bonding a pigment and an aggregate. The setting agent is a mixture of cement powder and water, a mixture of cement powder, resin and water, or a mixture of resin, water and solvent and may additionally contain powders of at least one of rock, ceramic, new ceramic, glass and plastic and, when necessary, may be further kneaded with a pigment or a colorant and, when found necessary, may have mixed therewith various kinds of powders or granules, various kinds of fibers and various kinds of additives. Examples of the powders or granules include slag, fly ash and light-reflecting granules. Examples of the fibers include metal fiber, carbon fiber, synthetic fiber and glass fiber. Examples of the additives include shrink proofing agents, congealing and setting agents, delaying agents, water proofing agents, inflating agents, water reducing agents and fluidizing agents.

In order to enhance the adherence between the setting agent and the pigment-containing aggregate, the aggregate is spread with or immersed in water, solvent, surface treatment agent, etc.

All the materials supplied into the main form are caused to set into an integral mass by propagating a setting agent between the aggregates by means of suction under vacuum, for example. A mixture of aggregate and setting agent may be used as the backing material 14. A plate of metal, wood, cement, glass, ceramic, etc. or a sheet of paper, non-woven fabric, woven fabric, plastic, etc. may be used as a backing layer 4, and all the materials may be set on and together with the backing layer 4 into an integral mass.

The dry material for producing a ceramic shaped article or a raw product for a ceramic shaped article may, for example, be constituted of one or more of clay, rock particles, rock granules, glass particles, glass granules, new ceramic particles, new ceramic granules, fine ceramic particles, fine ceramic granules and glaze, with or without a pigment or colorant added thereto. The dry material may be one which has absorbed some water or has added thereto a lubricant-bonding agent after drying, but it is not kneaded with water or the lubricant-bonding agent and is in a state readily amenable to pulverization. The wet material used in this case is kneaded with water of a lubricant-bonding agent. The backing material used in this case may, for example, be constituted of one or more of clay, rock particles, rock granules, glass particles, glass granules, new ceramic particles, new ceramic granules, fine ceramic particles and fine ceramic granules with or without a pigment or colorant added thereto. In the finished state, the backing material is required to differ from the aforementioned pattern course materials in color, luster, texture and the like and may either be dry similarly to the pattern course materials or be kneaded with water, lubricant-bonding agent, etc. When found necessary, either the pattern course materials or the backing material may contain inorganic hollow microspheres including Shirasu balloons, pulverized particles or granules of ceramic, grains or granules of metal, ore etc. and may also contain various additives of lubricants, bonding agents, foaming agents, fluidization preventing agents, supernatant agents, close-contact promoting agents and the like. A raw product for a ceramic shaped article is obtained by supplying all the materials into the main form, then pressing the materials without or after adding a prescribed amount of water or lubricant-bonding agent so that the materials are plasticised into an integral mass, and removing the integral mass from the main form. The raw product is then sintered to obtain a ceramic shaped article. Otherwise, a ceramic shaped article is obtained by supplying all the materials into a refractory setter, heating the materials within the setter to be melted or fused into an integral mass, and removing the integral mass. When the pattern course material is made of enamel, stained glass or crystal glass a ceramic shaped article is obtained by supplying the material onto a sheet of metal, glass, ceramic, etc. to form a layer of material, melting or fusing the material by heating to make the material integral with the sheet.

Examples of the dry pattern course material for producing a plastic shaped article include particles or granules of plastic, with or without a pigment and colorant added thereto, and may contain a plasticizer, solvent, etc. However, the dry pattern course material is not kneaded with a plasticizer, solvent, etc. and is in a state readily amenable to pulverization. The wet pattern course material used in this case is kneaded with a plasticizer, solvent, etc. The backing material used in this case may be either a dry material or a wet material obtained by kneading with a plasticizer, solvent, etc. Examples of plastic usable in this case include polyethylene, nylon, polypropylene, polycarbonate, acetal, polystyrene, epoxy, vinyl chloride, natural rubber, synthetic rubber, acrylnitrile-butadiene-styrene, polyphenylene oxide, ethylene-vinyl acetate copolymer, fluorine resin or other thermoplastic and thermosetting resins. Both the pattern course materials and the backing material may, as found necessary, contain various additives of foaming agent, antioxidant, thermostabilizer, crosslinking agent, etc. These materials are melted or fused by heating and, if necessary, applying pressure thereto during heating, thereby obtaining an integral mass. By this method, a patterned foamed styrol shaped article, patterned plastic bathtub, patterned floor tile, etc. can be produced. The integral mass may be made integral with a backing material such as a plate of metal, wood, cement, ceramic, etc. or a sheet of paper, non-woven fabric, woven fabric, plastic, etc.

Examples of the dry pattern course materials for producing confectionery or other shaped foodstuffs include particles or granules of one or more of wheat, rice, potato, bean, corn and sugar. The materials may additionally contain seasonings and spices and may also contain oil or water, but are not kneaded with oil or water and are in a state readily amenable to pulverization. The wet pattern course material is kneaded with water or oil. The backing material may be either dry similarly to the dry pattern course materials or wet by kneading with oil or water. Both the pattern course materials and the backing material may, as found necessary, further contain an inflating agent and other additives. All the materials supplied into the main form are allowed to set or caused to set by adding a prescribed amount of water or oil to be plasticized into an integral form. The integral mass is, when necessary, pressed and removed from the main form to obtain a raw product. The raw product is then baked. Otherwise, all the materials are baked within the main form. With this method, it is possible to produce patterned baked confectionery. It is also possible to produce a patterned shaped article melted by heating, such as a patterned chocolate shaped article etc. by using particles or granules of the material melted by heating, such as chocolate etc. and melting and fusing the particles or granules by heating.

Figure 14A:
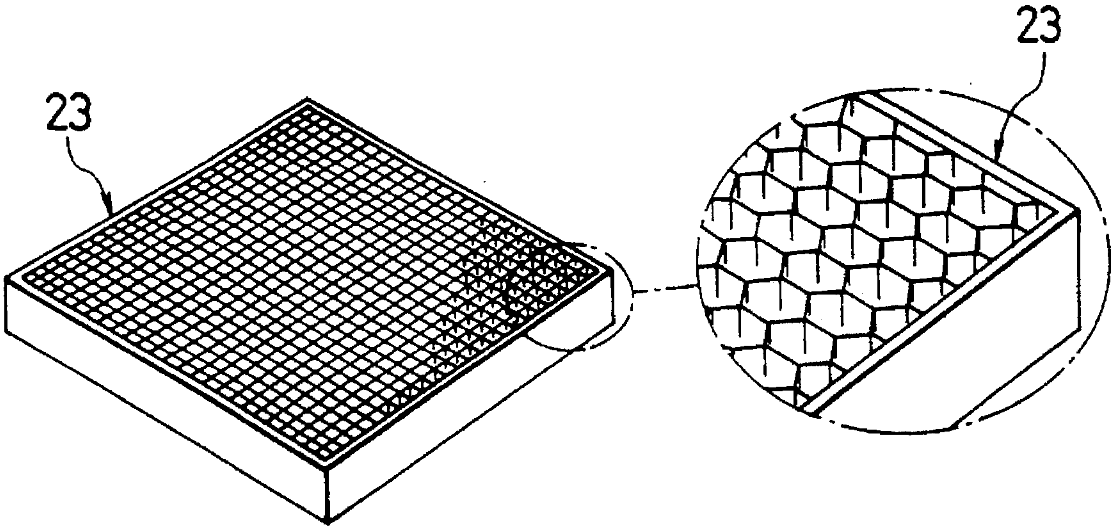
FIG. 14(A) is a perspective view showing a cell form used as a mask in the method according to the present invention, with an inset showing a partial enlarged perspective view of the mask.
Figure 14B:
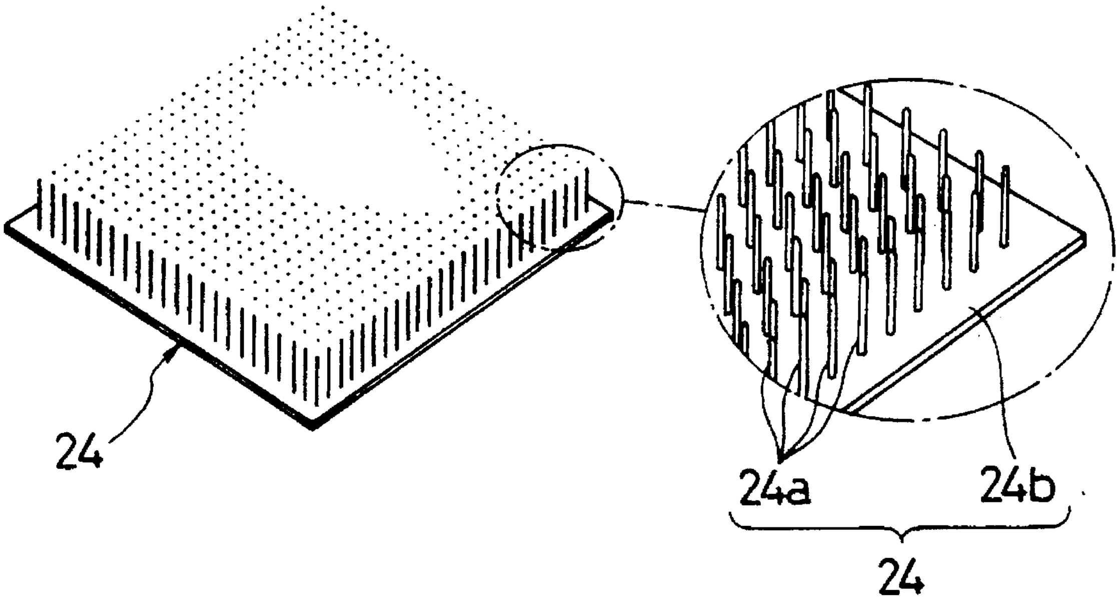
FIG. 14(B) is a perspective view showing a bristle form used as a mask in the method according to the present invention, with an inset partial enlarged perspective view of the mask.

When a mask is used, the boundaries between adjacent pattern course materials can be minutely expressed and the pattern formed is very clear-cut. Any one or combination of the sheet masks 21, 22 and 26 shown in FIG. 7 and FIG. 17, insert-type mask 25 shown in FIG. 16, cell-form mask 23 shown in FIG. 14(A) and bristle-form mask 24 shown in FIG. 14(B) can advantageously be used. The insert-type mask 25 is formed into a strap frame having a contour constituting part of the pattern to be formed, for example, so that it is vertically inserted into the first material. The height of the insert-type mask 25 is preferably the same as or slightly larger than the thickness of the shaped article to be removed from the main form. The cell-form mask 23 has a plurality of cells of the same height and a square or honeycomb shape disposed in a dense and contiguous manner. The bristle-form mask 24 comprises a support member 24b and a plurality of projections 24a rising from the support member.

In using the sheet mask 21 or 22, it is applied to a layer of the first material. In the case of the strap-frame mask 25, cell-form mask 23 or bristle-form mask 24, it is inserted into a layer of the first material or disposed beforehand on a given surface. In the methods shown in FIGS. 6, 8, 10, 12 and 14 in which the pattern-course materials 11, 12, 13, 15 and 16 are supplied onto the bottom of the main form 7, for example, the strap-frame mask 25, cell-form mask 23 or bristle-form mask 24 is set in place within the main form 7 and the materials are then supplied to the inside and outside of the strap-frame mask 25, into the cells of the cell-form mask 23 or between the projections 24a of the bristle-form mask 24. When the strap-frame mask 25, cell-form mask 23 or bristle-form mask 24 is made of a material insoluble with water etc., it is removed from the main form 7 a prescribed time after all the materials have been supplied. Otherwise, the shaped article that has not yet completely set is removed from the main form and the mask is then removed from the shaped article. When the mask is made of a material soluble with water etc., such as a wafer, water-soluble vinylon and water-soluble plastic, it need not be removed. When the projections 24a of the bristle-form mask 24 are attached to the support member 24b with water-soluble adhesive, the projections 24a are left within the shaped article while the support sheet 24b is peeled off the shaped article.

The projections 24a of the bristle-form mask 24 shown in FIG. 7 or FIG. 14 are pin-shaped. However, they may be in the form of pieces, fibers, filaments, pipes, loops, etc. insofar as they rise densely from the upper surface of the support member 24b.

When a sheet mask having an opening is pressed against the materials disposed on a given surface, since the materials serve as a bridge between the sheet mask and the given surface, part of the materials exposed to the outside through the opening can be removed neatly.

A bulk mat is laid on a given surface and an insert-type mask is thrust against the mat to remove the material. As a result, a concave portion is formed neatly. When the insert-type mask has cuts formed therein, it can advantageously be used even when the given surface is curved.

The concave portion may be formed by (1) a method which comprises supplying materials into a main form, placing a sheet mask having an opening on the materials, applying pressure to the sheet mask, and turning the whole upside down, (2) a method which comprises either supplying materials into a main form and inserting an insert-type mask having an opening into the materials or placing the insert-type mask in the main form and supplying the materials into the main form, applying to the materials a sheet mask having an opening of the same shape as that of the opening of the insert-type mask, and turning the whole upside down, (3) a method which comprises placing a sheet mask having an opening on a given surface, disposing a surrounding frame on the sheet mask, supplying materials into the surrounding frame, placing the bottom plate of a main form, applying pressure to the materials, and turning the whole upside down, or (4) placing a sheet mask having an opening on a given surface, disposing on the sheet mask an insert-type mask having an opening of the shape as that of the opening of the sheet mask, disposing a surrounding frame on the sheet mask and outside the insert-type mask, supplying materials into the surrounding frame, applying a bottom plate of a main form to the materials, and turning the whole upside down. In the methods (1) and (2), part of the materials falls out of the opening of the sheet mask to form a concave portion, then the whole is turned again upside down, and finally supplying materials into the concave portion. In the methods (3) and (4), part of the materials falls out of the opening of the sheet mask to form a concave portion, and materials are supplied into the concave portion. In the methods (2) and (4), either a sheet mask integral with an insert-type mask or a bristle-form mask having a support member formed with an opening may be used instead of the two separate masks. Another method for forming a concave portion comprises either supplying materials on an air permeable member and inserting an insert-type mask having an opening into the materials or disposing the insert-type mask on the air permeable member and supplying materials on the air permeable member, and blowing air from the outside on a portion of the air permeable member corresponding in position to the opening of the insert-type mask to blow away the materials in the insert-type mask. For example, a concave portion is formed by disposing a surrounding frame on an air permeable mat, disposing an insert-type mask having an opening in the surrounding frame, supplying materials into the surrounding frame, and blowing air from the outside on a portion of the mat corresponding in position to the opening of the mask.

By rubbing with a brush or comb or applying a jet of air or water to the portion of the boundary between the different kinds of materials for the pattern layer before supplying the backing material 14 in the case where the pattern course materials 11, 12 and 13 are disposed under the backing material 14 within the main form 7 as shown in FIG. 8 or after the pattern course materials 11, 12, 13, 15 and 16 have been supplied in the case where these pattern course materials are exposed to the outside as shown in FIGS. 6, 9, 11, 13 and 15, the pattern can be blurred.

When the main form 7 is constituted of a frame member and a bottom plate separable from the frame member and serving as the given surface, the pattern course materials 11, 12 and 13 supplied into the main form can be made integral with an existing concrete shaped article, for example, by placing the main form containing therein the pattern course materials on the existing concrete shaped article and removing the bottom plate from the frame member to dispose the bottom of the pattern course materials directly on the surface of the existing concrete shaped article. When the bottom plate is inseparable from the frame member, it is possible to make the pattern course materials integral with the existing concrete shaped article by covering the upper surface of the main form having the pattern course materials contained therein with a lid member, turning the main form upside down, and removing the lid member from the main form to dispose the surface of the pattern course materials directly on the surface of the existing concrete shaped article.

By laying a mat of non-woven fabric or any other water or oil absorbing material to be in contact with the surface or bottom of the shaped article, any excess amount of water, lubricant-bonding agent, oil, plasticizer or solvent contained in part of the materials can be absorbed or supplied to other part of the materials to uniformize the amount of water, lubricant-bonding agent, oil, plasticizer or solvent in the entire shaped article. In this case, since the water (auxiliary agent) to cement (resin) ratio of the shaped article becomes small, the strength of the shaped article can be enhanced. An air-permeable mat is advantageously used in press molding the supplied materials because degassing is promoted to enable production of a dense shaped article.

The method using a wet material kneaded with water, lubricant-bonding agent or solvent as the first material and the method using a dry material as the first material differ in that the former method requires the first material to be deprived of moisture and the second material to be dry.

The content of water, lubricant-bonding agent or solvent in the layer of the first material formed on a given surface is determined in view of the thickness of the layer so that the first material is given suitable fluidity. Owing to this suitable fluidity of the first material, the layer of the first material having a uniform thickness can be formed with ease.

If the moisture of the layer of the first material is absorbed to congeal the first material, part of the first material can be removed without causing a cave-in action of the material, whereby a concave portion can be formed neatly. The moisture absorption relies on a water or oil absorbing mat of woven fabric, non-woven fabric, urethane, etc. or a vacuum pump utilizing a filter. The water or oil absorbing mat or the filter may serve concurrently as a mask to decrease the number of the steps.

The finished surface of a shaped article to be obtained can be curved if a deformable mat or a partially or entirely deformable main form is used in any one of the aforementioned methods. There may be provided two given surfaces, one for forming a layer thereon and the other for allowing the layer to set thereon. That is to say, the steps of supplying materials to form a layer, removing part of the layer to form a concave portion and supplying materials into the concave portion are effected on one of the given surfaces, and the resultant layer is moved onto the other given surface on which the layer is allowed to set into an integral mass. The removal of part of the layer may be effected by means of suction under vacuum or reduced pressure or by the blowing-away method. The sucking and blowing-away intensity is adjusted case by case.

A shaped article can be reinforced with long fiber, short fiber, wire mesh or other reinforcement placed in or between the pattern course layer and the backing layer. When any article obtain by the sheet making method or extrusion molding method, plate or sheet is used as the backing layer, the shaped article obtained can be used as an architectural panel or board, a wall sheet, a tile or the like.

The base plate of a main form or the surface of a backing material supplied into the main form was said to be used as the given surface for convenience in explanation. However, the surface of a roll or an endless mat or sheet can also be utilized as the given surface, whereby large-sized architectural plates or confectionery dough can be produced continuously.

It is possible to form a joint pattern of native rock etc. on a cutting surface by accumulating a plurality of pattern layers, causing the pattern layers to set into an integral mass and cutting the integral mass vertically. When vibration or pressure is applied to the pattern layer in causing the layer to set, it is possible to produce a dense shaped article.

According to the present invention, it is possible to easily produce concrete shaped articles, artificial stone shaped articles, raw products for ceramic shaped articles, ceramic shaped articles, crystalline glass shaped articles, enameled wares, cloisonne wares, plastic shaped articles and shaped foodstuffs each having a pattern of a prescribed thickness formed on the partial or entire surface thereof. Therefore, the patterned shaped articles can maintain their patterns in excellent condition even when exposed to surface abrasion.

Since the pattern layer is formed by a combination of a dry material and a dry or wet material, the materials can be densely charged without any gap owing to their cave-in action and the boundaries between adjacent materials can be minutely expressed. The pattern formed is thus very clear-cut. In addition, it is also possible to positively disturb the charged materials either at the boundaries between them or as a whole after the materials have been changed. Doing this enables the production of shaped articles which resemble marble or other kinds of native rock.

Unlike the prior art, which takes much time and labor to produce a shaped article because a plurality of materials for constituting a pattern are separately supplied with their shapes retained, the present invention can rapidly produce a shaped article having a complex pattern with ease owing to the adoption of the steps of supplying a first material onto a given surface to form a wide base-course layer of a prescribed thickness on the given surface, then removing part of the base-course layer to form at least one concave portion, and thereafter filling the at least one concave portion with a second material. In the case of the shaped article shown in FIG. 5, overlapped patterns of the tree with flowers or birds can be obtained selectively, for example, by removing part of the material representing the leaves to form concave portions of flowers or birds and supplying materials representing flowers or birds into the concave portions and/or by removing part of the material representing the trunks to form concave portions and supplying a material representing the bark into the concave portions. Furthermore, since it is possible to produce not only small-sized shaped articles but also large-sized shaped articles, it is possible to form patterns on various sheets including wallpaper. In the case of the production of either a raw product for a ceramic shaped article or a ceramic shaped article, it is possible to produce various kinds of elements, circuits, antennas, etc. with ease by combining at least two kinds of materials for an insulator, conductor, semiconductor, dielectric, piezoelectric device, magnetic substance, etc. In addition, when the produced article is used as an architectural board, since the pattern is kept intact in the board even if it should be chamfered, cutting treatment can be effected without any restriction.

What is claimed is:

1. A method for producing a patterned shaped article, comprising the steps of:

forming on a main form a layer of a first particulate dry material having a prescribed thickness, said first particulate dry material being readily amenable to pulverization before charging onto the given surface, said main form having a bottom plate and sidewalls surrounding said bottom plate;

removing part of said layer by using a mask to form at least one concave portion in said layer;

filling said at least one concave portion in said mask with at least one kind of second material different in color and quality from said first material; and causing said first and second materials to set in said mask into an integral mass.

2. A method according to claim 1, wherein the step of removing part of said layer to form at least one concave portion in said layer is effected by suction.

3. A method according to claim 1, wherein the step of removing part of said layer to form at least one concave portion in said layer is effected by turning said layer upside down.

4. A method according to claim 1, wherein the step of removing part of said layer to form at least one concave portion in said layer is effected by blowing air.

5. A method according to claim 1, wherein the step of removing part of said layer using a mask includes using a sheet mask having an opening of a configuration corresponding to a pattern to be formed.

6. A method according to claim 1, wherein the step of removing part of said layer using a mask includes using an insert-type mask having a configuration corresponding to a pattern to be formed.

7. A method according to claim 1, wherein the step of removing part of said layer using a mask includes using an insert-type cell-form mask.

8. A method according to claim 1, wherein the step of removing part of said layer using a mask includes using an insert-type bristle-form mask.

9. A method as claimed in claim 1, which comprises placing the mask on top of said first particulate dry material.

* * * * *